US012756258B2

(12) United States Patent
Gecgel et al.

(10) Patent No.: US 12,756,258 B2
(45) Date of Patent: Oct. 6, 2026

(54) ARRANGEMENT FOR GUIDING ELECTRICAL CONNECTIONS THROUGH AN OPENING OF A HOUSING AND COMPRESSOR FOR A REFRIGERANT WITH AN ARRANGEMENT FOR GUIDING ELECTRICAL CONNECTIONS THROUGH AN OPENING OF A HOUSING

(71) Applicant: Hanon Systems, Daejeon (KR)

(72) Inventors: Senol Gecgel, Cologne (DE); Johannes Stausberg, Cologne (DE); Bodo Schröder, Cologne (DE)

(73) Assignee: HANON SYSTEMS, Daejeon (KR)

( * ) Notice: Subject to any disclaimer, the term of this patent is extended or adjusted under 35 U.S.C. 154(b) by 748 days.

(21) Appl. No.: 18/305,463

(22) Filed: Apr. 24, 2023

(65) Prior Publication Data

US 2023/0344299 A1 Oct. 26, 2023

(30) Foreign Application Priority Data

Apr. 22, 2022 (DE) ........................ 102022109738.2
Jan. 5, 2023 (DE) ........................ 102023100226.0

(51) Int. Cl.

*H02K 5/10* (2006.01)
*H02K 5/22* (2006.01)
*F04C 29/00* (2006.01)
*F25B 31/02* (2006.01)

(52) U.S. Cl.

CPC ............... *H02K 5/10* (2013.01); *H02K 5/225* (2013.01); *F04C 29/00* (2013.01); *F25B 31/02* (2013.01); *F25B 2400/07* (2013.01)

(58) Field of Classification Search

CPC .......... H02K 5/10; H02K 5/225; F04C 29/00; F25B 2400/07
USPC .......................................................... 439/521
See application file for complete search history.

(56) References Cited

U.S. PATENT DOCUMENTS 8,840,381 B2 * 9/2014 Fukasaku ................ F04B 35/04 310/71
8,851,923 B2 * 10/2014 Klaassen ............... F04C 23/008 439/587
11,128,193 B2 * 9/2021 Heo ........................ F04C 27/00
12,266,879 B2 * 4/2025 Gunermann ........... H01R 13/17
(Continued)

FOREIGN PATENT DOCUMENTS

CN 102655722 A 9/2012
CN 102678557 A 9/2012
(Continued)

*Primary Examiner* — Harshad C Patel
(74) *Attorney, Agent, or Firm* — Shumaker, Loop & Kendrick, LLP; James D. Miller

(57) ABSTRACT

An arrangement for guiding electrical connections through an opening of a housing for a device for driving a compressor, having a connection arrangement with at least one holding element and at least one electrically conductive connection element, is based on the object of indicating a solution which enables a simple and secure guiding of electrical connections through a housing, wherein the effort for the production and the assembly and the costs connected thereto are to be minimized and at the same time, the preciseness during assembly and thus the quality are to be improved. This object is achieved in that the holding element has one positioning means each on two opposite sides.

12 Claims, 8 Drawing Sheets

(56) References Cited

U.S. PATENT DOCUMENTS

| | | | | |
|---|---|---|---|---|
| 12,424,354 | B2 * | 9/2025 | Guntermann | H01B 17/301 |
| 12,500,468 | B2 * | 12/2025 | Lee | H02K 3/522 |
| 2011/0020153 | A1 * | 1/2011 | Murakami | H02K 5/225<br>417/410.1 |
| 2011/0158833 | A1 * | 6/2011 | Murakami | F04C 23/008<br>417/422 |
| 2013/0142682 | A1 * | 6/2013 | Watanabe | F01C 21/007<br>310/71 |
| 2014/0375157 | A1 * | 12/2014 | Taguchi | H02K 3/44<br>310/71 |
| 2018/0358860 | A1 * | 12/2018 | Major | H02K 11/33 |

FOREIGN PATENT DOCUMENTS

| | | | |
|---|---|---|---|
| JP | 2007250340 | A | 9/2007 |
| JP | 2010168914 | A | 8/2010 |
| JP | 2016211490 | A | 12/2016 |
| JP | 6402678 | B2 | 10/2018 |
| KR | 102172263 | B1 | 10/2020 |
| KR | 20210105248 | A | 8/2021 |

* cited by examiner

ARRANGEMENT FOR GUIDING ELECTRICAL CONNECTIONS THROUGH AN OPENING OF A HOUSING AND COMPRESSOR FOR A REFRIGERANT WITH AN ARRANGEMENT FOR GUIDING ELECTRICAL CONNECTIONS THROUGH AN OPENING OF A HOUSING

CROSS-REFERENCE TO RELATED APPLICATIONS

This patent application claims priority to and the benefit of German Patent Application No. DE 102023100226.0 filed on Jan. 5, 2023 and German Patent Application No. DE 102022109738.2 filed on Apr. 22, 2022, the entire disclosures of each of which are hereby incorporated herein by reference.

TECHNICAL FIELD

The invention relates to an arrangement for guiding electrical connections through an opening of a housing for a device for driving a compressor. The arrangement has a connection arrangement with at least one electrically conductive connection element, at least one holding element and at least one shape element. The connection arrangement is arranged on the housing.

The invention also relates to a compressor for a refrigerant with an arrangement for guiding electrical connections through an opening of a housing for a device for driving a compressor.

Compressors for mobile applications, in particular for air-conditioning systems of motor vehicles, for transporting refrigerant through a refrigerant circuit, also referred to as refrigerant compressors, are known from the state of the art. Such refrigerant compressors are driven either via a pulley which is connected to a drive unit of the motor vehicle via a belt, or electrically.

Apart from an electric motor for driving the respective compression mechanism, an electrically driven refrigerant compressor mostly also has a so-called inverter.

The inverter serves to convert a direct voltage of a vehicle battery arranged in the on-board network to an alternating voltage with which the electric motor of the compressor is driven. A corresponding control of the inverter enables a regulated operation of the electric motor, in particular in motor vehicles with on-board network voltages of 48 V or above 60 V.

The present invention in particular relates to an electrical connection arrangement for a motor vehicle in which direct voltages of 48 V, 60 V or more, for example, are required for the operation of electrical assemblies, as can be specifically the case with electrically driven motor vehicles or motor vehicles with a so-called hybrid drive.

The electrical connection arrangement can serve to transfer voltages from an inverter to an electric motor in an electrically driven refrigerant compressor.

When using an inverter for driving electrical motors with high voltages, in particular in motor vehicles with on-board network voltages over 60 V, these are so-called high voltage applications, shortly referred to as HV applications, in particular in the field of motor vehicles.

Electrically driven refrigerant compressors with a housing in which the electric motor for driving a compression mechanism is arranged are known from the state of the art. The housing, in particular the compressor housing, is to be formed to be sealed against moisture and dirt. As the electric motor arranged in the housing is to be supplied with a voltage provided by the inverter for operation, so-called electrical feedthroughs are to be provided, which one the one hand enable a transfer of the voltage into the housing and on the other hand do not influence the tightness of the housing.

Electrical feedthroughs are understood to be, for example, electrical conductors or similar means for the electrical connection of an electrical load arranged in a sealed housing to an electrical assembly arranged outside of the housing. Such an electrical assembly can be an inverter of a motor vehicle. In this case, the voltage created by the inverter for the operation of the electric motor is transferred to the electric motor arranged in the sealed housing.

Such electrical feedthroughs with several electrical conductors as elements for the electrical connection of assemblies are also known as e-pin plates and are referred to as connection arrangement hereinafter.

Conventionally, such connection arrangements are produced by means of a so-called "glass-to-metal-seal" technology, shortly referred to as GTMS, which enables vacuum-tight connections between glass and metal.

The glass-to-metal-seal technology is used for the production of electrical feedthroughs in order to contact electrical components arranged within hermetical housings. Such electrical feedthroughs offer high-quality mutual insulation of the electrically conductive connection elements which carry the voltages to be transferred and against the housing of an electrically driven refrigerant compressor, for example. Furthermore, such electrical feedthroughs have a long service life and have a high tightness.

Such connection elements known from the state of the art have a holding element in which several electrically conductive connection elements are arranged. The connection elements are fixed within the holding element surrounded by the holding element. A shape element produced by means of the glass-to-metal-seal technology which ensures a tight fit of the connection elements in the holding element is provided between the electrically conductive connection elements. The connection elements are arranged in the holding element in a fluid-tight manner.

Conventionally, the holding element has several through bores for receiving attachment elements, specifically screws, in order to attach the holding element to a housing of an electrically driven refrigerant compressor, for example. Corresponding sealing elements are used for the fluid-tight attachment of the holding element against the housing.

BACKGROUND ART

Differently formed connection elements are known from the state of the art.

KR 102172263 B1 reveals a scroll compressor of a vehicle air-conditioning system driven by an electric motor. The electrically driven compressor is formed to connect a conductive pin of an air-tight terminal to a connection terminal of a terminal housing in a simple and exact manner.

The electrically driven compressor has a compression unit with a fixed spiral and an orbiting spiral for compressing a refrigerant, a motor unit connected to the compression unit and exerting a rotational force on the compression unit and an inverter unit connected to the motor unit in order to enable a power input and a transfer of power and of a control signal to the motor unit. Additionally, an insulating unit and an electrically conductive element are provided, the two ends of which are electrically contacted with the motor unit on the one hand and with the inverter unit on the other hand in order to electrically connect the motor unit to the inverter unit.

The compressor also has a connection arrangement with three electrically conductive connection elements which are fixed in a holding element in a fixed and fluid-tight manner by means of corresponding shape elements. The holding element is attached to a housing by means of two screws.

JP 2007 250 340 A describes a structure of a hermetically tight terminal with a sealing element, for example an O-ring. The structure which can be produced in a simple manner is to enable easy handling when creating a sealing element with an air-tight terminal. A metal substrate from a main substrate with a structure and an auxiliary substrate, which are mutually laminated and between which a groove is formed, is indicated. An O-ring as a sealing element is arranged within the groove. The substrates are attached and sealed in an air-tight manner by means of a glass element which is penetrated by a terminal. As both substrates are attached by the glass element and do not have any direct connection to one another, different thermal expansions of the substrates influence the structure of the hermetically tight terminal only slightly. Thus, distortions or deformations are avoided.

The O-ring as a sealing element is to be arranged in a separate and very complex assembly step and correspondingly is to be oriented exactly. If the assembly of the O-ring is not exact, the sealing properties of the hermetically tight terminal deteriorate.

In JP 2010 168 614 A, an electrically driven compressor for use in a motor vehicle is shown. The compressor has an integrated inverter and an electric motor arranged in a pressure vessel which drives a compression unit. In order to guarantee the tightness of the pressure vessel, a sealing terminal with an assembly plate which covers an opening of the pressure vessel in an air-tight manner is provided. The assembly plate is penetrated by several terminal pins which are fixed with glass as an insulator. The specification of the sealed terminal is determined by the permissible current value, the compressive strength and the required insulation distance.

JP 2016 211 490 A reveals a motorized compressor. The compressor has a compression unit for compressing a fluid, an electric motor for driving a compression unit, an inverter as a drive circuit for the provision of the corresponding voltage for controlling the electric motor and a housing for separating a motor chamber for receiving the electric motor. A through opening with an air-tight terminal with at least one connection pin for the electrical connection of the electric motor and the inverter is formed within the housing. The motor chamber and an inverter chamber for receiving the inverter are sealed by means of a sealing element which is arranged between an inner surface of the through opening and the air-tight terminal.

In a method for producing the hermetically tight terminal, a support plate is created, wherein a plate-like base element is pressed using the pressing machine such that a circumferential rib is formed. For this purpose, a tensioning device is used in order to form at least one convex portion in a region of a surface opposite to the surface of the plate-like base element. The convex portion is shaped from the material of the plate-like base element by means of corresponding pressure forces acting on the surface. For this purpose, a tool which provides at least one groove is used. The convex portion, which is also referred to as a protrusion, is shaped within the groove. Subsequently, the support plate is provided with three through openings in which the connection pins are arranged.

Additionally, the convex portion of the support plate is arranged in a concave portion formed in a bottom wall when joining the individual parts within a positioning portion. Furthermore, the sealing element, which has positioning insertion openings, is to be introduced. The convex portions of the support plate are guided through the positioning insertion openings of the sealing element. Apart from the positioning insertion openings, the sealing element also has screw openings and slots. The assembly of the individual parts for producing the hermetically tight terminal by means of the support plate is extremely complex, in particular due to the specific preparation of the plurality of individual parts and the assembly thereof.

The arrangements known from the state of the art must have a respective holding element with a corresponding stiffness. It is common practice to punch out the holding element from a correspondingly strong or thick metal sheet. Accordingly, when using such metal sheets with a thickness in the range from 3.0 mm to 5.0 mm, the punching tools required in a punching method for punching out the holding elements are heavily stressed, which results in increased costs and to a correspondingly high wear of the punching tools.

In conventional connection arrangements with corresponding holding elements, a large number of attachment elements is required, for example three or more screws, in order to fix the holding element to a housing of a refrigerant compressor in a fixed and fluid-tight manner, for example. The number of the screws depends on the used sealing element, for example, which can be a metal seal or an O-ring and is arranged between the holding element and a housing. However, with an increasing number of screws to be attached, the assembly effort during production of an assembly, in particular consisting of a refrigerant compressor with a connection arrangement, increases. Consequently, the number of the required screws is to be minimized.

Thus, there is a need for the provision of an improved arrangement for guiding electrical connections through a housing for a device for driving a compressor or for an improved connection arrangement on the one hand and for an improved compressor for a refrigerant with such an arrangement for guiding electrical connections through a housing on the other hand.

SUMMARY

The object of the invention is to specify an arrangement for guiding electrical connections through an opening of a housing for a device for driving a compressor with a connection arrangement and a compressor for a refrigerant with an arrangement for guiding electrical connections through an opening of a housing which enable to guide electrical connections through a housing in a simple and safe manner. For this purpose, the production and assembly effort and the associated costs are to be minimized on the one hand and on the other hand, the preciseness during assembly and thus the quality are to be improved at the same time. Additionally, the connection arrangement should only require a minimum amount of space.

The object is respectively achieved through a subject matter with the features shown and described herein.

The object is achieved through an arrangement for guiding electrical connections through an opening of a housing for a device for driving a compressor. The arrangement has a connection arrangement with at least one holding element and at least one electrically conductive connection element and at least a part of the housing on which the connection arrangement with the holding element is arranged.

The connection element is arranged on the housing with the holding element over the opening such that the holding element closes the opening.

According to the concept of the invention, the holding element is formed with a respective positioning means on two opposite sides.

Advantageously, the electrically conductive connection elements respectively have a first region and a second region. A respective fixation region is formed between the first region and the second region. In the fixation region of the connection elements, a respective associated shape element which fully encloses the connection element can be arranged. The shape element which fully encloses the connection element in the fixation region, for example, is surrounded by the holding element. The holding element has corresponding openings or through bores in which the shape element with the connection element is arranged, for example.

After the assembly of the holding element on a housing of a device for driving a compressor, wherein the device for driving the compressor can be an electric motor which drives a compression unit for compressing a refrigerant, the electrically conductive connection element, with the first region which is arranged outside of the fluid-tight housing of the compressor with the electric motor, is electrically connected to a voltage source, in particular an inverter.

The electrically conductive connection element, with a second region, which is arranged within the fluid-tight housing of the device for driving the compressor, can be electrically connected to a load, such as the electric motor, at least indirectly.

According to an advantageous design of the invention, the connection arrangement has a holding element in which three electrically conductive connection elements are arranged by means of the respective associated shape elements in the holding element, for example.

According to a further development of the invention, the holding element of the connection arrangement has a longitudinally extended shape. The length of the holding element is much larger than the width. Thus, the holding element has two opposite longitudinal sides and two end sides opposite one another on the ends of the holding element formed in a longitudinal extension. The positioning means are preferably arranged on the opposite end sides.

Such a positioning means enables a very exact and quick positioning of the holding element of the connection arrangement on the opening of the housing through which one or more electrical connections are guided in a fluid-tight manner. Thus, the assembly procedure of the holding element of the connection arrangement on the opening is simplified, the positioning preciseness during assembly is improved and the assembly step is accelerated. A correspondingly exact positioning of the holding element of the connection arrangement and thus of the electrically conductive connection elements is required as a position preciseness of the electrically conductive pins is to be followed subsequent to the assembly procedure in order to guarantee the proper electrical contacting on the motor side or fluid side and on the inverter side. A positioning of the holding element only with the attachment elements is inaccurate, such that the electrical contact on the motor side and the inverter side does not fulfill the specification or the tolerance requirements.

According to an advantageous design of the invention, a reinforcement means which extends at least partially over the longitudinal side is provided on at least one of the longitudinal sides of the holding element.

The arrangement of the at least one such reinforcement means increases the stiffness of the holding element of the connection arrangement which enables to produce the holding element from a material with a small thickness. A holding element punched out from a sheet, for example, with a reduced thickness has, due to the arrangement of one or two reinforcement means arranged on the longitudinal sides of the holding element, a stiffness which, without a reinforcement means, can only be achieved through the use of a substantially thicker sheet for the holding element.

Concerning the holding element of the invention, a thickness of a sheet between 2.5 mm and 3.5 mm is sufficient, depending on the type of the reinforcement means.

The use of a material with a small wall thickness for the holding element, such as a sheet, reduces the stress and the wear on a punching tool with which the holding element is produced in a punching method. Thus, the period of use of the punching tool is extended and the costs for the production of the holding element are reduced.

An advantage of the invention is that respectively one reinforcement means which respectively extends over the full length of the holding element is arranged on both opposite longitudinal sides of the holding element. The two opposite longitudinal sides extend between the end sides in a straight line.

Such a reinforcement means is achieved through chamfering of a strip respectively formed on the longitudinal side of the holding element, for example. The strip is chamfered in a respective angle of about 90 degrees, for example. Such a holding element can be produced, for example, by punching out the holding element from a corresponding sheet in a first production step. In a second production step, a respective strip of the holding element is chamfered on the longitudinal sides in order to form the reinforcement means.

As an alternative, the reinforcement means can also be created through a double chamfering of a respective strip arranged on the longitudinal side of the holding element. Consequently, the alternative reinforcement means has two partial strips, wherein the first partial strip, which is directly connected to the holding element, is oriented at an angle of about 90 degrees to the surface of the holding element, for example, after chamfering. The second partial strip of the reinforcement means, which is connected to the first partial strip, is oriented through further chamfering such that it is oriented in parallel to the surface of the holding element, for example. Consequently, the reinforcement means is created through oppositely directed chamfering of the partial strips.

According to a further advantageous design of the invention, a respective notch is provided on the ends of the reinforcement means. The notches arranged between the reinforcement means and the end sides of the holding element prevent the transfer of bending forces created during the production of the reinforcement means by means of chamfering into the region of the end sides of the holding element. Thus, deformations in the regions of the end sides of the holding element are efficiently prevented.

According to a preferred design of the invention, the positioning means have a rectangular or triangular or at least partially round, in particular circular shape. The round shape of the positioning means is formed with a fixed radius.

The positioning means, which are preferably arranged on the opposite end sides of the holding element, advantageously have a predetermined shape which corresponds to a shape of a guiding means attached or shaped in the region of the opening of the housing. The positioning means of the holding element and the guiding means of the housing are formed complementarily such that the positioning means of the holding element can be precisely introduced into the guiding means attached to the housing or shaped on the housing and thus result in an exact orientation of the holding element to the housing and the connection arrangement over the opening of the housing. Subsequently to this precise arrangement of the holding element on the housing, the holding element is fixedly connected to the housing by means of attachment means, such as by means of two screws.

If the positioning means has a rectangular shape, for example, the guiding means also has a rectangular shape. The outer dimensions of the positioning means and the inner dimensions of the guiding means have such a difference to one another that a clearance for assembly and thus a relative movement towards one another is possible. The precision is determined by means of profile tolerances on the positioning means and on the guiding means. The outer contours of the positioning means are identical to the inner contours of the positioning means at least in a fixed region. The profile tolerances are about 0.1 mm.

In an alternative design, the outer contours of the positioning means which are rectangular or triangular or have a rounding, for example, rest on the contours of the guiding means only at specific points, such that the holding element also is arranged over the opening of the housing in an exact orientation. The guiding means can be formed in a cylindrical shape, for example, and arranged in the region of the positioning means in pairs.

A fluid-tight termination of the opening of the housing is achieved, for example, b<inserting a shaped seal of elastomer, such as ethylene-propylene-diene-rubber (EPDM), into a groove which is exactly milled on the housing between the holding element and the housing. The shaped seal additionally compensates a deformation of the holding element caused by the internal pressure in the housing and thus prevents leakage.

The object is also achieved through a compressor according to the invention for a refrigerant with the arrangement for guiding electrical connections through a housing for a device for driving the compressor. The compressor has a housing with an opening for guiding through electrical connections. The connection arrangement according to the invention with the holding element and the positioning means is arranged over the opening of the housing such that the opening in the housing of the compressor is closed.

Advantageously, guiding means, which receive the positioning means of the holding element in a form-fitting manner, are arranged on the housing of the compressor for the precise and simple positioning of the connection arrangement with the holding element. The guiding means can be attached to the housing of the compressor in the region of the opening or incorporated into the wall of the housing. This can be through a correspondingly embodied mold for a housing created in a molding method, for example. As an alternative, the guiding means can be incorporated into the housing through milling, wherein the inner contours of the guiding means are created with high accuracy.

The connection arrangement with the holding element and the positioning means is arranged over the opening for guiding through electrical connections which is arranged over the housing of the compressor, such that the opening is closed. A fluid-tight closure of the housing of the compressor is achieved with the insertion of a shaped seal of elastomer, such as ethylene-propylene-diene-rubber (EPDM), into a groove which is exactly milled on the housing between the holding element and the housing. The shaped seal additionally enables a compensation of a deformation of the holding element caused by the internal pressure in the housing, which, on the other hand, prevents the occurrence of leakage.

BRIEF DESCRIPTION OF DRAWINGS

Further details, features and advantages of designs of the invention result from the following description of example embodiments with reference to the accompanying drawings. Wherein.

DESCRIPTION OF AN EMBODIMENT OF THE INVENTION

Figure 1:
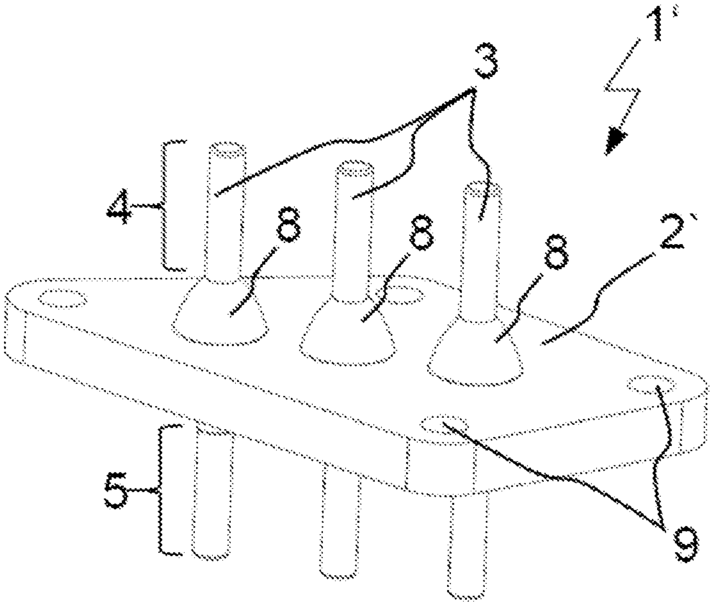
FIG. 1 PRIOR ART
FIG. 1: a connection arrangement of the state of the art in a perspective view.

FIG. 1 shows a connection arrangement 1' of the state of the art in a perspective view. The connection arrangement 1' is part of an arrangement for guiding electrical connections through an opening of a non-represented housing for a device for driving a compressor.

The connection arrangement 1', which has a quadrangular, in particular a squared or a rectangular holding element 2' in top view, is formed with four through bores 9 for receiving attachment element, specifically screws. The holding element 2' and thus the connection arrangement 1' is fixed on the non-represented housing of the electrically driven refrigerant compressor by means of the attachment means.

The connection arrangement 1' has three electrically conductive connection element 3 which are arranged in the holding element 2' such that a respective first region 4 of the electrically conductive connection elements 3 protrudes from a first side of the holding element 2', while a respective second region 5 of the electrically conductive connection elements 3 protrudes on a second side of the holding element 2' opposite to the first side.

As an example, the connection elements 3 are respectively fixed in the holding element 2' through shape elements 8 in a fixed and fluid-tight manner.

The first electrically conductive connection elements 3, with the respective first regions 4, are connected to a non-represented voltage source, such as an inverter, for example. With the second regions 5, the electrically conductive connection elements 3 can respectively be connected to a load arranged in the fluid-tight housing, for example. The load can be an electric motor arranged in the housing of the refrigerant compressor which drives a compression unit, in particular a scroll compressor.

Figure 2:
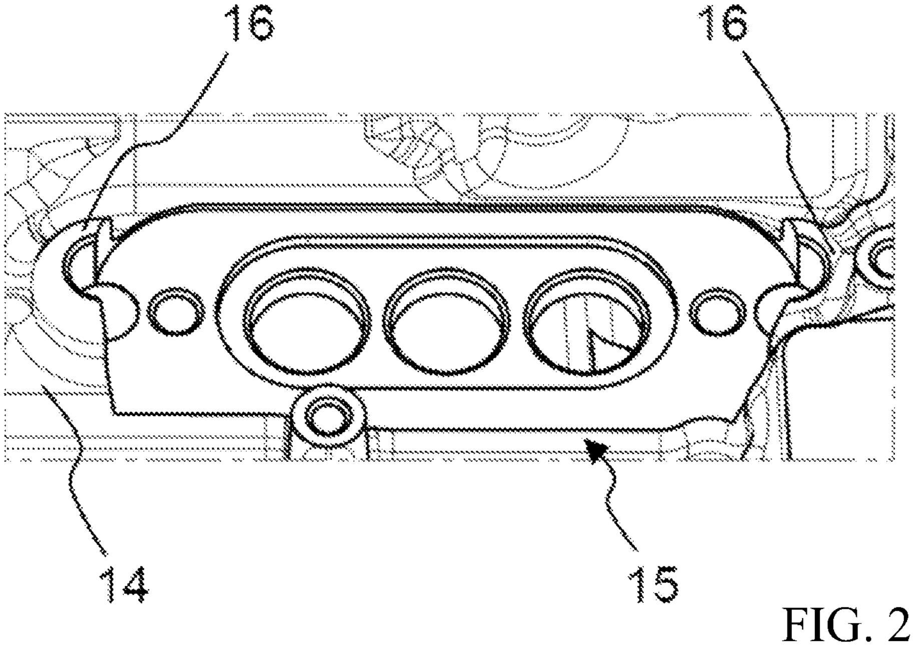
FIG. 2: an excerpt from a housing of a refrigerant compressor with an opening for guiding through electrical connections.

FIG. 2 shows a housing 14 of the refrigerant compressor with an opening 15 for guiding through electrical connections. The opening 15 is formed such that a non-represented holding element 2 of the connection arrangement 1 with three electrically conductive connection elements 3 can be arranged within the opening 15. The second region 5 of the three electrically conductive connection elements 3 is arranged in the interior of the housing 14 of the refrigerant compressor. In a first embodiment, the housing 14 has guiding means 16 in the region of the opening 15.

Figure 3A:
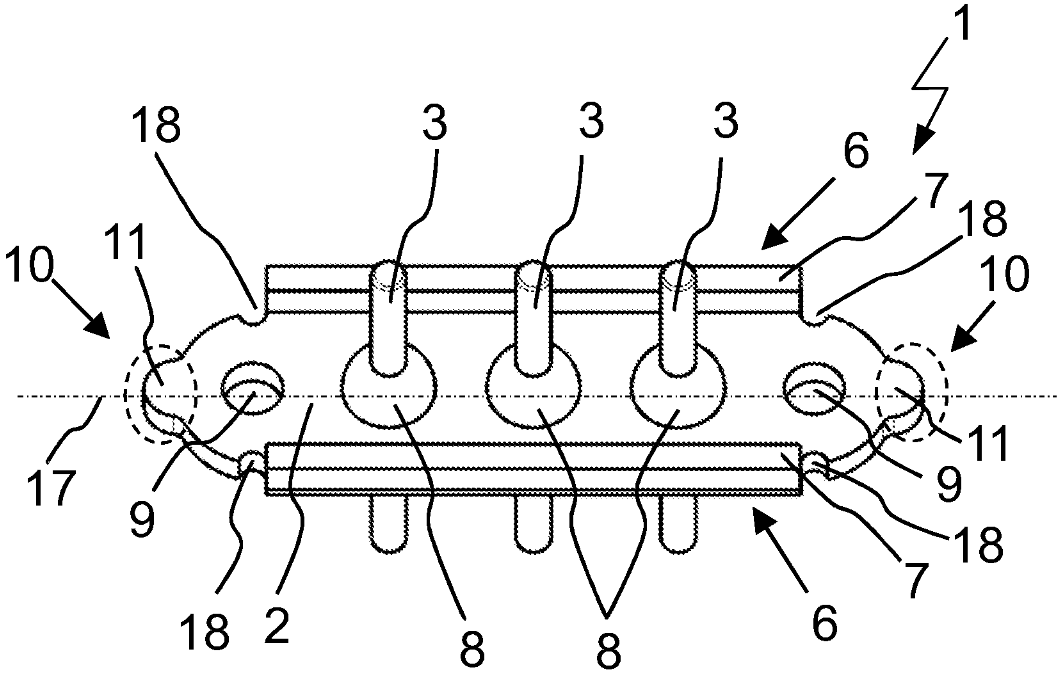
FIGS. 3A and 3B: a connection arrangement with a holding element and connection elements in perspective views.
Figure 3B:
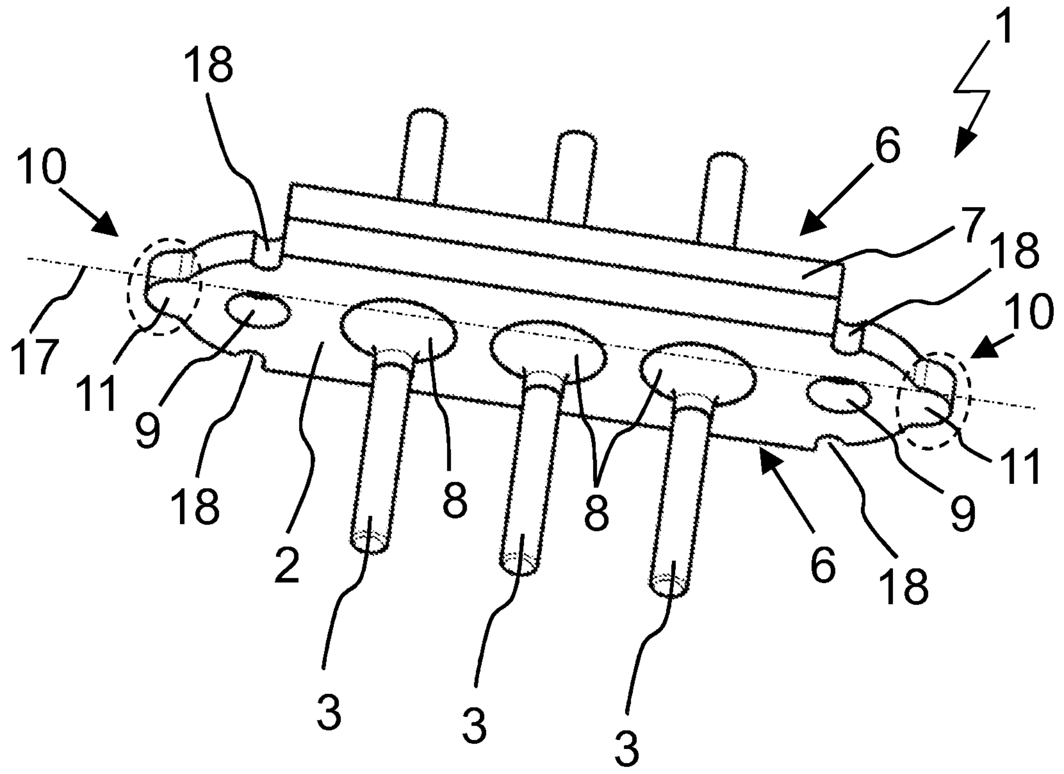

In FIGS. 3A and 3B, a connection arrangement 1 with a holding element 2 and three electrically conductive connection elements 3 are respectively represented in a perspective view, in particular from two different sides. The holding element 2 has a longitudinally extending, nearly rectangular shape. A respective reinforcement means 7 is formed on the two opposite longitudinal sides 6.

The three electrically conductive connection elements 3 arranged along a longitudinal axis 17 of the holding element 2 oriented in the longitudinal direction are respectively fixed in the holding element 2 in a fixed and fluid-tight manner through shape elements 8.

The holding element 2 of the connection arrangement 1 has, in the region of opposite end sides 10, respectively one through bore 9 for receiving the attachment elements which are provided for fixing the connection arrangement 1 over the non-represented opening 15 of the housing 14. Screws, which are not represented either, can be used for attachment.

Additionally, positioning means 11, which are represented framed by means of a circular dotted line for clarity, are formed on the opposite end sides 10 of the holding element 2.

The positioning means 11 have an at least partially round, in particular circular shape with a fixed radius. The non-represented housing 14 on which the connection arrangement 1 is fixed, is formed with corresponding guiding means 16 shaped complementarily to the positioning means 11 of the holding element 2 and which correspond to an also at least partially round, in particular circular shape with the same fixed radius as the counter piece to the positioning means 11.

Notches 18 are provided between the reinforcement means 7 and the end sides 10 of the holding element 2. These notches 18 prevent the transfer of bending forces created during the production of the reinforcement means 7 by means of chamfering into the region of the end sides 10 of the holding element 2 and resulting deformations in the regions of the end sides 10.

Figure 4A:
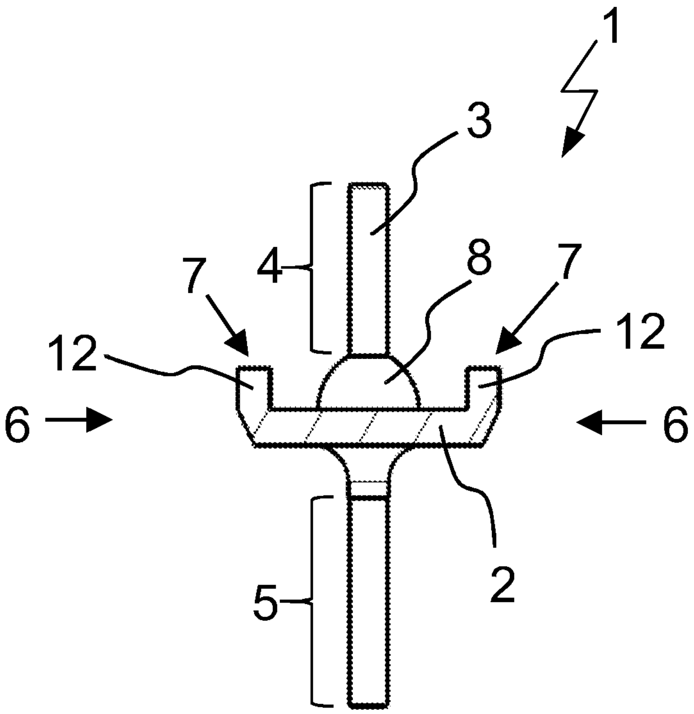
FIGS. 4A to 4C: the connection arrangement with different embodiments of reinforcement means in a respective side view.
Figure 4B:
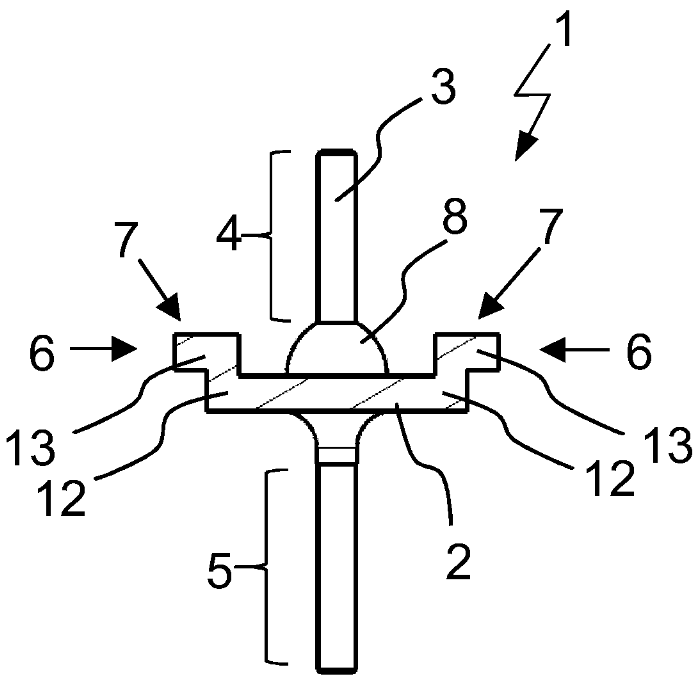
Figure 4C:
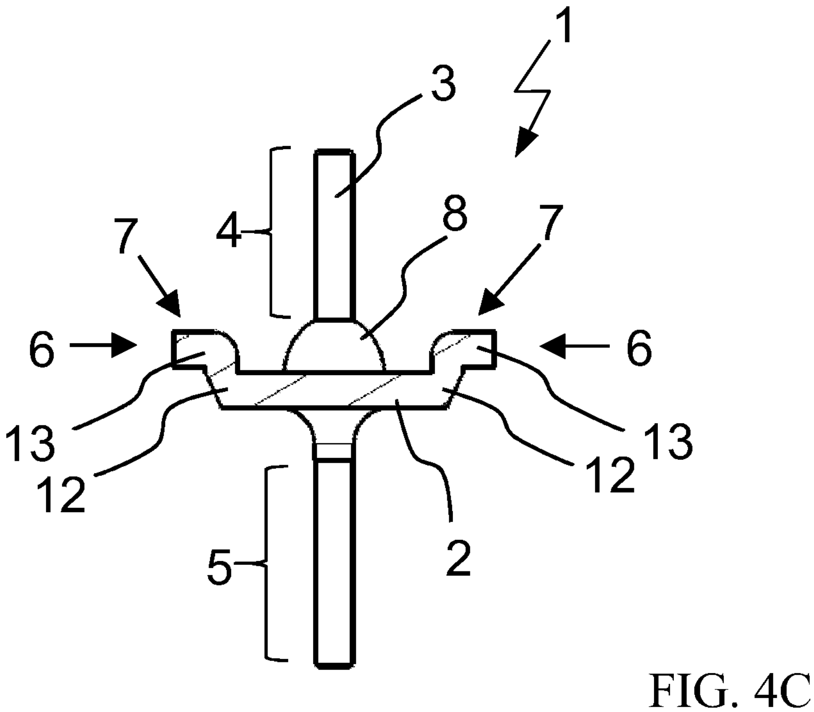

FIGS. 4A to 4C reveal the connection arrangement 1 with different embodiments of the reinforcement means 7 in a respective side view. In the representation of FIGS. 4A to 4C, respectively one of the three electrically conductive connection elements 3 guided through the holding element 2 with the associated shape element 8 is visible.

The first region 4 of the electrically conductive connection element 3 protrudes on the first side of the holding element 2, while the second region 5 of the electrically conductive connection element 3 protrudes from the second side of the holding element 2 opposite the first side.

The respective reinforcement means 7 are formed on the longitudinal sides 6 of the holding element 2. The reinforcement means 7 arranged opposite to one another respectively have a first partial strip 12 which is produced through a simple chamfering on the longitudinal sides 6 of the holding elements 2, as represented in FIG. 4A.

The oppositely arranged reinforcement means 7 in FIGS. 4B and 4C respectively have a first partial strip 12 and a second partial strip 13.

The respective first partial strip 12 has an orientation at an angle of about 90 degrees to the surface of the holding element 2, while the second partial strip 13 is respectively arranged in parallel to the surface of the holding element 2. The first partial strips 12 are chamfered towards a common side of the holding element 2. The second partial strips 13 are respectively oriented to the outside. A restriction to this formation shape of the reinforcement means 7 is not intended.

The differences of the embodiments of the connection arrangements 1 of FIGS. 4B and 4C are in the formation of the reinforcement means 7, in particular the transition regions between the partial strips 12, 13. The transition regions between the partial strips 12, 13 of the embodiment according to FIG. 4B do not have any radii or chamfers, while the transition regions between the partial strips 12, 13 of the embodiment according to FIG. 4C are respectively formed with a radius and a chamfer.

Figure 5A:
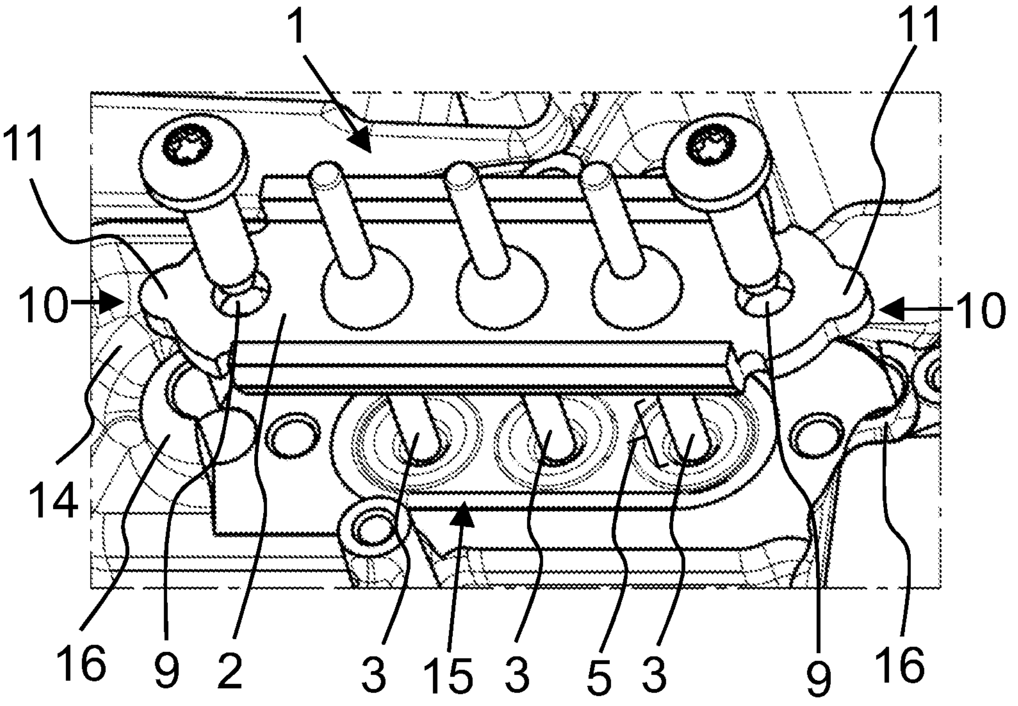
FIGS. 5A and 5B: the connection arrangement from FIGS. 3A and 3B on the opening of the housing and in the state assembled on the housing, FIG. 5C the connection arrangement after the assembly on the housing of the refrigerant compressor in a sectional view.
Figure 5B:
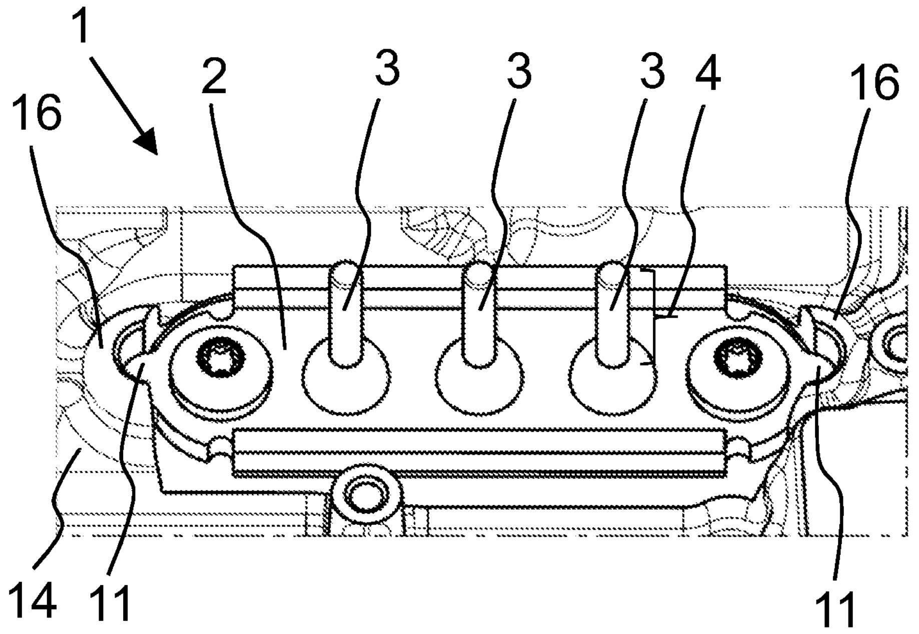

FIGS. 5A and 5B respectively show the connection arrangement 1 from FIGS. 3A and 3B and the housing 14 of the refrigerant compressor. In FIG. 5A, the connection arrangement 1 over the opening 15 of the housing 14 of the refrigerant compressor, which is represented in excerpts, is represented before and during an assembly step. During the assembly step, the electrically conductive connection elements 3 arranged in the holding element 2, with the second regions 5, are oriented in the direction of the provided recesses of the opening 15 and the connection arrangement 1 is arranged on the opening 15, such that the opening 15 is closed. The exact positioning of the connection arrangement 1 over the opening 15 is via the cooperation of the positioning means 11 arranged on the holding element 2 which are positioned to fit to the guiding means 16 arranged on the housing 14.

For a fluid-tight connection, a non-represented shaped seal which is formed from an elastomer, for example, is arranged between the holding element 2 of the connection arrangement 1 and the housing 14.

For the fluid-tight arrangement of the connection arrangement 1 over the opening 15 on the housing 14, corresponding attachment means are used, such as the screws represented in FIGS. 5A and 5B, with which the connection arrangement 1 is fixedly pressed to the housing 14. While FIG. 5A shows the attachment means, such as screws, before the introduction into the through bores 9 of the holding element 2, FIG. 5B represents the state after the assembly in which the connection arrangement 1 is screwed in a manner fixedly pressed to the housing 14.

After the assembly step, the second region 5 of the electrically conductive connection elements 3, which is then arranged inside fluid-tight housing 14 of the refrigerant compressor, is connected to a load, such as the electric motor of the refrigerant compressor, in an electrically conductive manner. After the assembly step, the electrically conductive connection elements 3, with the second region 5, which is then arranged inside fluid-tight housing 14 of the refrigerant compressor, are connected to a load, such as the electric motor of the refrigerant compressor, in an electrically conductive manner.

For a time-saving and precise assembly, the positioning means 11 arranged on opposite end sides 10 of the holding element 2 have a predetermined shape which corresponds to the shape of the guiding means 16 arranged or shaped on the housing 14 in the region of the opening 15. In the example of FIGS. 5A and 5B, the positioning means 11 and the guiding means 16 are respectively formed in a round shape with a fixed radius.

Figure 5C:
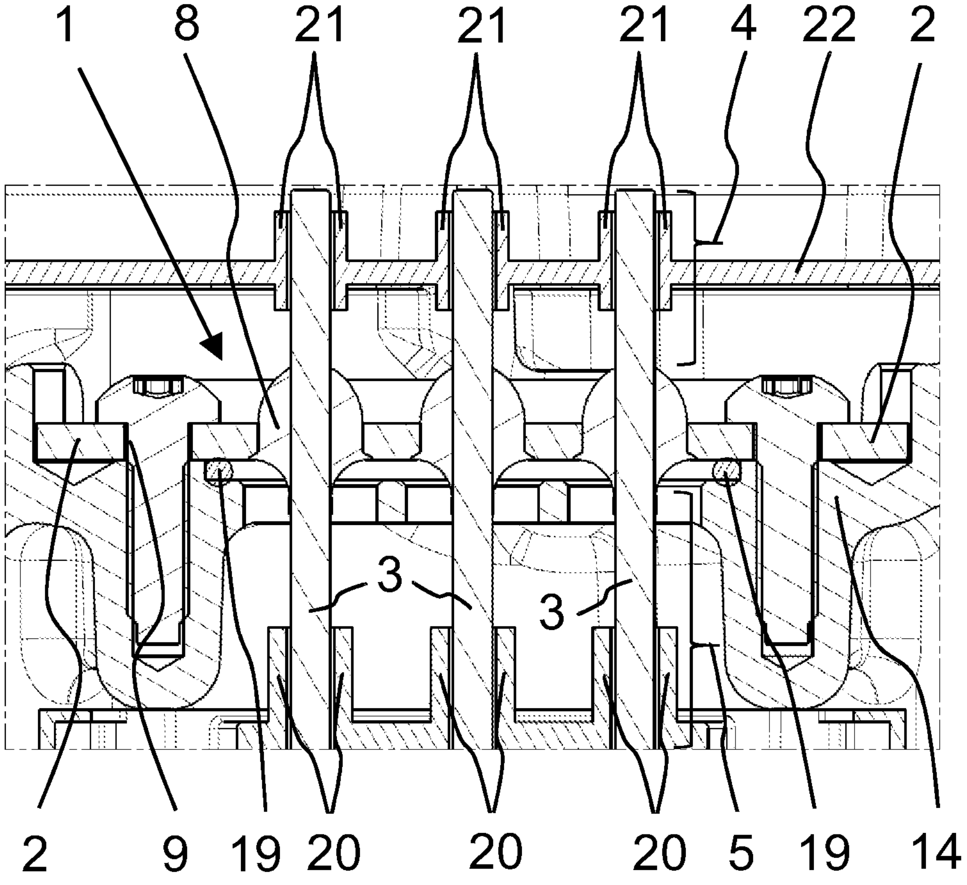

FIG. 5C shows the connection arrangement 1 after the assembly on the housing 14 of the refrigerant compressor in a sectional view. For a fluid-tight connection, the holding element 2 is fixedly pressed to the housing 14 with two attachment elements, such as screws, inserted into the through bores 9. Additionally, a shaped seal 19, which is formed from an elastomer, for example, is arranged between the holding element 2 of the connection arrangement 1 and the housing 14.

After the assembly step, the three electrically conductive connection elements 3 represented in FIG. 5C, with the second regions 5, which are arranged inside the fluid-tight housing 14 of the refrigerant compressor, are respectively connected to first terminals 20 of a load, such as the electric motor of the refrigerant compressor, in an electrically conductive manner. The first terminals 20, on the other hand, are coupled to stator windings of the electric motor of the refrigerant compressor, for example. Additionally, after the assembly, the three electrically conductive connection elements 3, with the first regions 4 arranged outside the fluid-tight housing 14, are connected to second terminals 21 of a circuit board 22 of an inverter controlling the electric motor in an electrically conductive manner, for example.

Figure 6A:
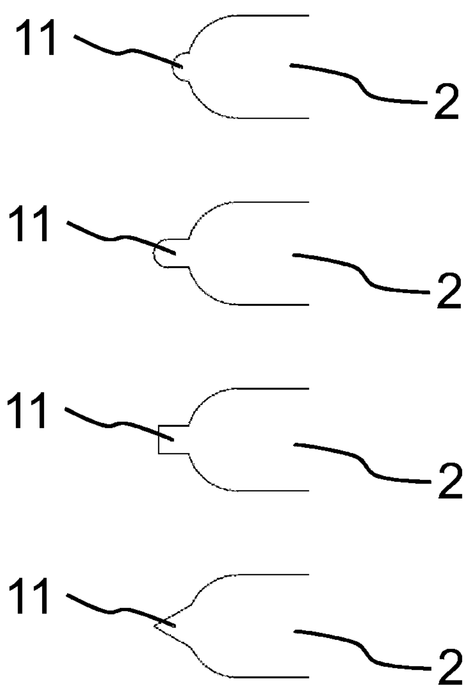
FIGS. 6A and 6B: different embodiments of positioning means formed on the holding element of the connection arrangement and in connection with complementarily formed guiding means on the housing.
Figure 6B:
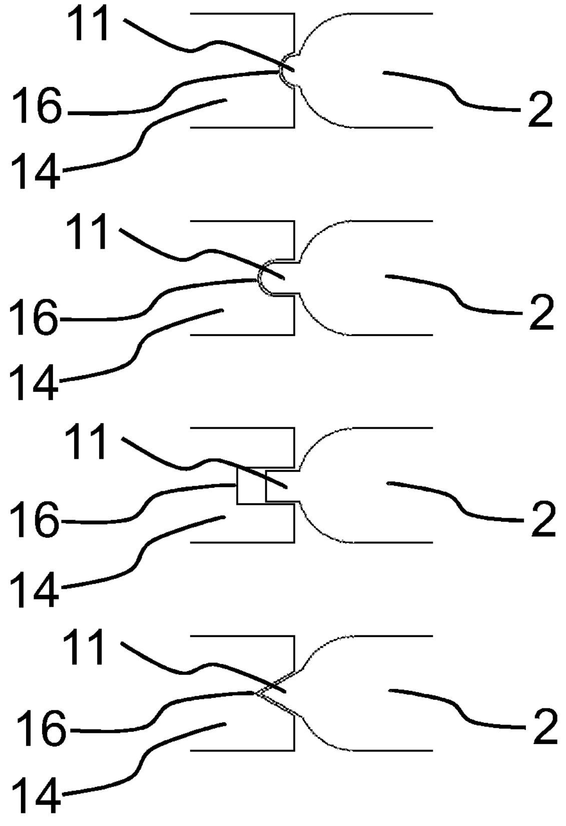

FIGS. 6A and 6B show different embodiments of positioning means 11 formed on the holding element 2 of the connection arrangement 1. In FIG. 6A, different embodiments of the positioning means 11 are represented, which can be formed, for example, with a round or semicircular, a longitudinally extending and round, a rectangular and a triangular formation.

In FIG. 6B, the positioning means 11 of the holding elements 2, in corresponding interaction of the different embodiments, are respectively represented with the associated guiding means 16 attached to the housing 14 or formed complementarily as the counter piece.

Figure 7:
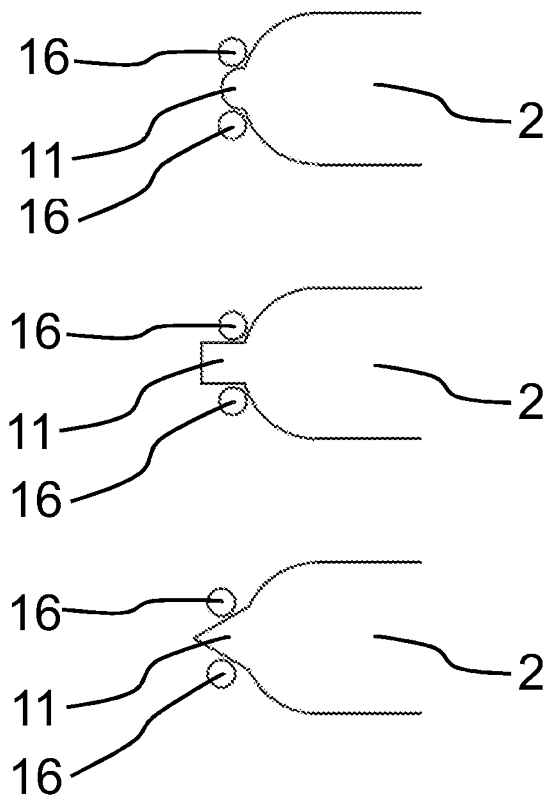
FIG. 7: different embodiments of positioning means on the holding elements with corresponding guiding means.

In FIG. 7, different embodiments of positioning means 11 of FIGS. 6A and 6B formed on the holding elements 2 are represented as an example. In contrast to the representation of FIG. 6B, in FIG. 7, the guiding means 16 are respectively formed as the counter piece to the positioning means 11 through cylindrical elements arranged in pairs, which rest on the shape formed by the positioning means 11 only in regions or at specific points. With such a formation of the guiding means 16 as well, a time-saving and precise assembly of the connection arrangement 1 over an opening 15 of the housing 14 is achieved.

LIST OF REFERENCE NUMERALS

1, 1' connection arrangement
2, 2' holding element
3 connection element
4 first region
5 second region
6 longitudinal sides
7 reinforcement means
8 shape element
9 through bore
10 end sides
11 positioning means
12 first partial strip
13 second partial strip
14 housing
15 opening
16 guiding means
17 longitudinal axis
18 notch
19 shaped seal
20 first terminals
21 second terminals
22 circuit board

What is claimed:

1. An arrangement for guiding electrical connections through an opening of a housing for a device for driving a compressor, the arrangement comprising a connection arrangement with at least one holding element and at least one electrically conductive connection element, wherein the connection arrangement is arranged over the opening on the housing such that the opening is closed, wherein the holding element has one positioning means each on two opposite end sides, wherein the holding element has a longitudinally extending shape with two longitudinal sides and the two opposite end sides, wherein the positioning means are respectively arranged on the two opposite end sides of the holding element, wherein a respective reinforcement means which extends at least partially over a respective one of the longitudinal sides is arranged on the longitudinal sides of the holding element.

2. The arrangement according to claim 1, wherein the positioning means have a rectangular or a triangular or an at least partially round, in particular circular shape, wherein the round shape of the positioning means has a fixed radius.

3. The arrangement according to claim 1, wherein the holding element of the connection arrangement is arranged on the housing, wherein the positioning means are form-fittingly arranged on guiding means formed on the housing.

4. The arrangement according to claim 1, wherein the holding element has through bores in the region of the two opposite end sides for receiving attachment means for fixing the holding element on the housing.

5. The arrangement according to claim 1, wherein the reinforcement means has a first partial strip and a second partial strip.

6. The arrangement according to claim 3, wherein the positioning means are embodied in a rectangular, triangular or at least partially round shape corresponding to the guiding means.

7. The arrangement according to claim 3, wherein the guiding means are embodied as cylindrical elements arranged in pairs.

8. The arrangement according to claim 1, wherein a shape element is arranged between the holding element and the electrically conductive connection element.

9. The arrangement according to claim 1, wherein notches are formed between the reinforcement means and the two opposite end sides of the holding element.

10. The compressor for a refrigerant with the arrangement for guiding through electrical connections for the device for driving the compressor according to claim 1, wherein the housing (14) has the opening (15) via which the connection arrangement is arranged, such that the opening is closed.

11. The compressor according to claim 10, wherein the housing has guiding means, in which the positioning means of the connection arrangement are arranged, in a region of the opening.

12. The compressor according to claim 11, wherein the guiding means arranged in the region of the opening of the housing are formed through the housing or on the housing.

* * * * *